United States Patent [19]

Kappernaros

[11] 4,081,062

[45] Mar. 28, 1978

[54] TORQUE DRIVE UNIT

[76] Inventor: James P. Kappernaros, 1623 Villanova St., Pittsburgh, Pa. 15206

[21] Appl. No.: 735,065

[22] Filed: Oct. 22, 1976

[51] Int. Cl.² ............................................. F16D 7/00
[52] U.S. Cl. .................................. 192/56 R; 64/30 R
[58] Field of Search ................. 192/56 R; 64/29, 30 R

[56] References Cited

U.S. PATENT DOCUMENTS

| 3,116,618 | 1/1964 | Lacey | 64/30 R |
| 3,136,400 | 6/1964 | Carr | 192/56 R |
| 3,979,925 | 9/1976 | Kato | 192/56 R X |

Primary Examiner—Edgar W. Geoghegan
Attorney, Agent, or Firm—Clarence A. O'Brien; Harvey B. Jacobson

[57] ABSTRACT

A drive assembly is provided including first and second torque input and torque output sections coupled together for relative rotation and limited relative displacement along the axis of relative rotation thereof. The input section includes structure for applying rotational torque thereto and the output section includes structure for applying rotary torque to a rotary driven member. Spring structure is connected between the sections yieldingly biasing the latter toward one set of limit positions of displacement along said axis and one of the units includes a spiral ramp concentric with the axis of relative rotation and the other of the sections includes a follower engaged with the ramp. The spiral ramp terminates at one end thereof in a circumferential race concentric with the axis of relative rotation of the sections and in which the follower is guidingly receivable for continuous movement therethrough after movement along the ramp from the end thereof remote from the race into the latter. The sections are displaced along the axis of relative rotation against the biasing action of the spring during movement of the follower along the ramp toward the race.

9 Claims, 13 Drawing Figures

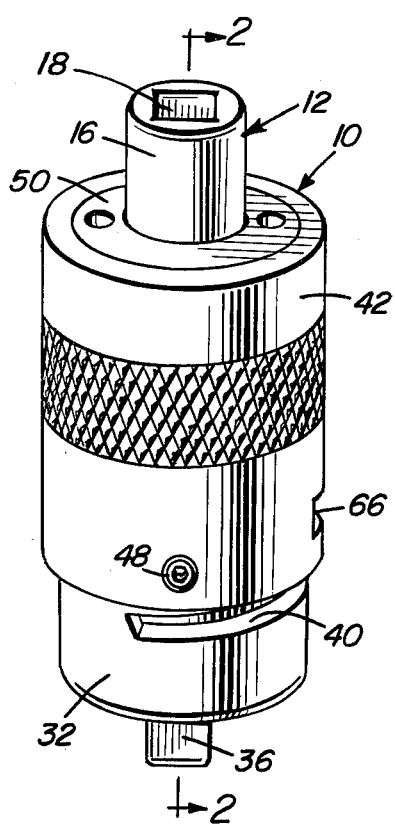
Fig. 1
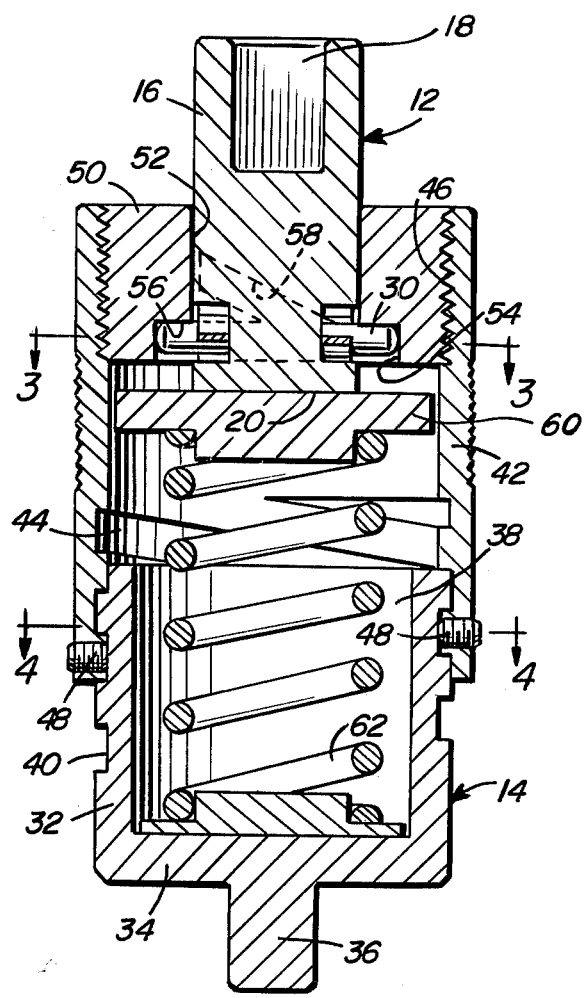
Fig. 2
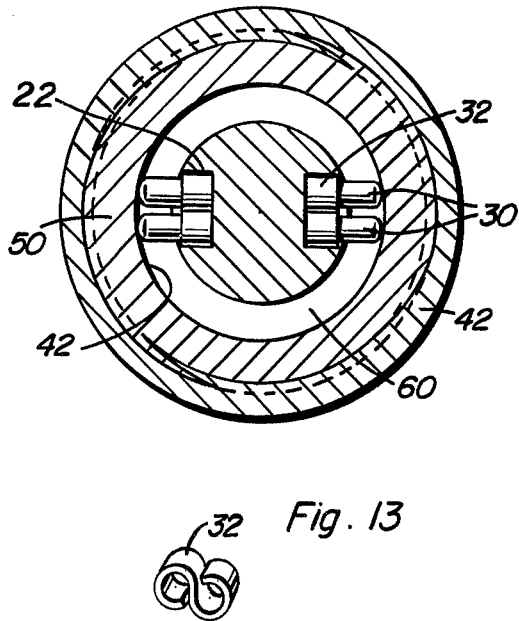
Fig. 3
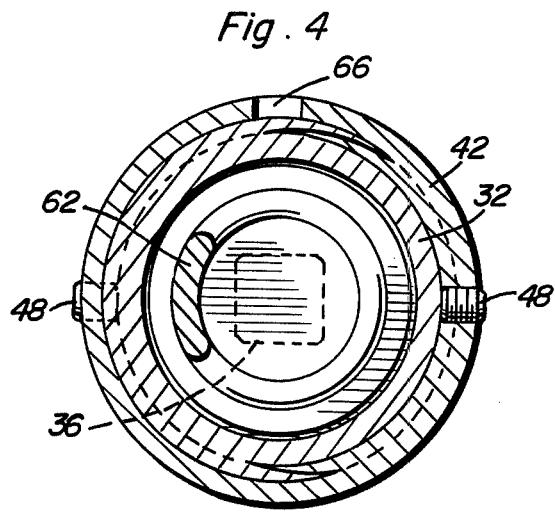
Fig. 4
Fig. 13

4,081,062

TORQUE DRIVE UNIT

BACKGROUND OF THE INVENTION

Various forms of torque overload release drive units have been heretofore provided. However, most of these units are quite complicated in construction and others are of the friction drive coupling type whereby considerable sliding friction is encountered at and beyond the point of overload release. This considerable friction can result in rapid heat build up and resultant failure of the drive unit. Therefore, a need exists for an improved form of overload release.

Examples of torque overload release drive units utilizing some of the basic structural and operational features of the instant invention are disclosed in U.S. Pat. Nos. 1,807,210, 1,953,182, 2,335,574, 2,471,614, 2,690,090, 3,116,618, 3,472,347, and 3,487,902.

BRIEF DESCRIPTION OF THE INVENTION

The torque overload release drive unit of the instant invention may be adjusted to release at varying torque loads. In addition, when the drive unit is in the overload release mode of operation, very little friction is encountered and the build up of heat in the drive unit while in the overload mode of operation is minimal. Accordingly, rapid deterioration or failure of the relatively movable parts of the drive unit is not encountered due to operation in the drive unit when the latter is operated in an overload mode.

The main object of this invention is to provide a torque overload release drive unit which will be capable of being adjusted according to the desired overload torque value.

Another object of this invention is to provide a drive unit in accordance with the preceding object and which will generate little sliding friction when operated in the overload mode.

Yet another object of this invention is to provide a torque overload release drive unit which may be utilized efficiently in various environments.

Another very important object of this invention is to provide a drive unit in accordance with the preceding objections and which may be manufactured so as to be operative through numerous ranges of adjustable overload torque.

A final object of this invention to be specifically enumerated herein is to provide a torque overload release drive unit in accordance with the preceding objects and which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the torque overload release drive unit of the instant invention;

FIG. 2 is an enlarged, vertical sectional view taken substantially upon the plane indicated by the section line 2—2 of FIG. 1;

FIG. 3 is a horizontal sectional view taken substantially upon the plane indicated by the section line 3—3 of FIG. 2;

FIG. 4 is a horizontal sectional view taken substantially upon the plane indicated by the section line 4—4 of FIG. 2;

FIG. 13 is a perspective view of the S-shaped strap retainer for the follower structure of the preferred form of the invention.

DETAILED DESCRIPTION OF THE INVENTION

Figure 5:
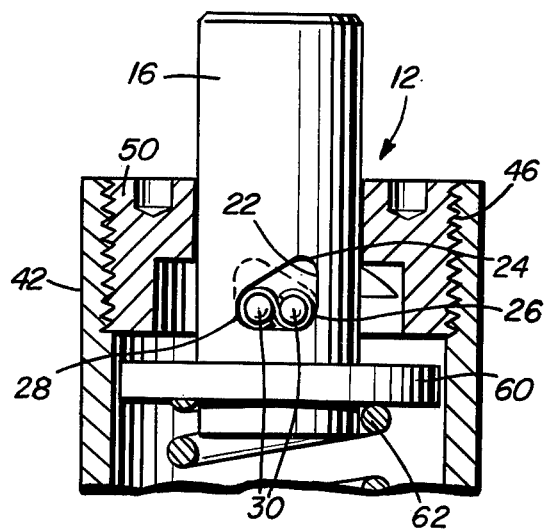
FIG. 5 is a fragmentary, vertical sectional view of the torque input end of the drive unit and illustrating the manner in which the shiftable follower portions are supported from the first torque input section.
Figure 6:
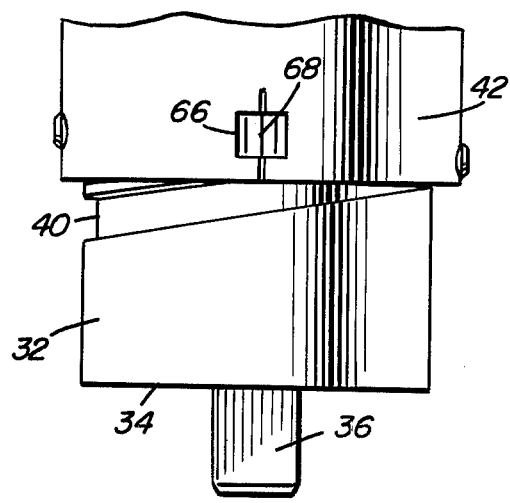
FIG. 6 is a fragmentary, elevational view of the torque output or lower end of the drive unit illustrating the manner in which indicia are provided to indicate the torque input value which will cause the drive unit to be operated in the overload mode.
Figure 7:
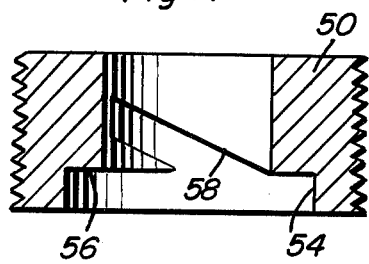
FIG. 7 comprises a vertical sectional view of the ramp defining component of the drive unit.

Referring now more specifically to FIGS. 1 through 5, the numeral 10 generally designates the torque overload release drive unit of the instant invention.

The unit 10 includes a first torque input section referred to in general by the reference numeral 12 and a second torque output section referred to in general by the reference numeral 14.

The torque input section 12 comprises a shaft member 16 having an endwise outwardly opening non-circular socket 18 formed in one end thereof and a smooth end face 20 formed on the other end thereof. The shaft member 16 includes diametrically opposite generally triangular radially outwardly opening recesses 22 formed therein. The recesses 22 are generally right triangular in configuration including rounded apex portions 24, 26 and 28.

A pair of cylindrical pin followers 30 are disposed partially within and projecting outwardly from each of the recesses 22 and each pair of pins 30 are held together by means of an S-shaped strap clip 32. The pins 30 are illustrated in FIG. 5 as being aligned in position between the apex portions 26 and 28. However, the pins 30 are swingable to positions aligned between the apex portions 24 and 28 as will be hereinafter more clearly apparent.

The output section 14 comprises a cylindrical member 32 including an end wall 34 at one end provided with an outwardly projecting non-circular drive shank 36. The end of the member 32 remote from the shank 36 defines an endwise outwardly opening recess 38 and the outer surfaces of the cylindrical member 32 are provided with coarse acme threads 40.

The output section 14 additionally includes a sleeve member 42 provided with internal acme threads 44 at one end and internal machine threads 46 at the other end. The acme threads 44 are engaged with the threads 40 with the sleeve 42 telescoped over and threadedly engaged with the end of the sleeve member 32 remote from the shank 36 and the sleeve member 42 includes diametrically opposite radial set screws 48 threadedly engaged therewith and engageable with the threaded end of the sleeve member 32 for releasably retaining the sleeve members 42 and 32 against rotation relative to each other.

An externally threaded cylindrical sleeve 50 is threadedly engaged in the machine thread equipped end of the sleeve member 44 and the input shaft portion 12 is rotatably and slidably received through a center bore 52 formed in the sleeve 50. The inner end of the bore 52 includes a diametrically enlarged counterbore 54 and the counterbore 54 defines a shouldered circumferential race 56. Further, the bore 52 includes an approximately one-quarter to one-half convolution spiral ramp 58 which opens at its end remote from the socket 18 into the race 56.

A thrust piston 60 is slidably received in the sleeve member 42 and a compression spring 62 is disposed between the end wall 34 and the piston 60 and yieldingly biases the latter toward a position closely opposing the axial inner end face of the sleeve 50.

The pins 30 are receivable in the groove or ramp 58 and also in the counterbore or race 56. Further, it will be noted that the sleeve 50 includes diametrically opposite ramps or grooves 58 and therefore that each pair of pins 30 may be seated in a corresponding groove or ramp 58.

The sleeve member 42 is provided with a radial window 66 registrable with indicia 68 formed on the outer surface of the sleeve member 32 whereby the adjusted relative angular displacement of the sleeve members 32 and 42 and the resultant preloading of the spring 62 may be indicated in the window 66.

Figure 9:
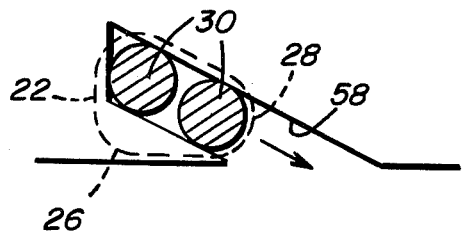
FIGS. 9 through 12 comprise schematic views illustrating sequential positions of the follower structure of the torque input section in relation to the ramp and race defining sections.
Figure 10:
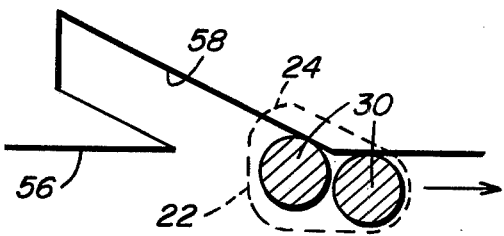
Figure 11:
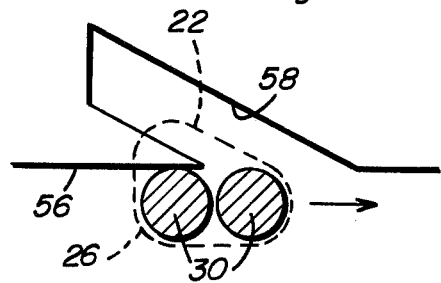
Figure 12:
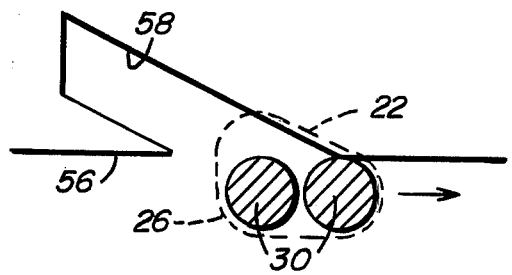

With attention now invited more specifically to FIGS. 9 through 12 of the drawings, assuming that the unit 10 is to be utilized to transfer driving torque and that the input section 12 is to be rotated in a clockwise direction as viewed from above, the pairs of pins 30 are initially seated in the grooves or ramps 58 in the positions thereof illustrated in FIG. 9. The tension of the spring 62 tends to resist longitudinal displacement of the input section 12 relative to the output section 14 and accordingly, light torque loads may be transferred through the drive unit 10. However, whenever the torque being transferred through the unit 10 exceeds its set maximum determined by the adjusted relative rotated positions of the sleeve members 32 and 42 and thus the tensioning of the spring 62, the camming action of the pins 30 on the ramps 58 is such as to cause the shaft member 16 to thread its way downwardly through the sleeve 50 to a position with the pins 30 substantially advanced out of the ramp or groove 58 and into the race 56, see FIG. 10. Then, the effective drive between the input shaft portion 12 and the output shaft portion 14 is terminated and the pins 30 ride around through the race 56 and back around toward subsequent registry with the ramp or groove 58. While the pressure of the spring 62 acting upon the piston 60 and frictional contact of the end face 20 with the piston 60 tends to force the shaft member 16 upwardly relative to the sleeve 50 to thus cause the pins 30 to reenter the lower ends of the grooves or ramps 58, the pins 30, retained together by the clip 32, tend to substantially fully bridge the end of the groove 58 opening into the race or counterbore 56. As the lead pin 30 is registered with the groove 58, the trailing pin 30 is still engaged in the race 56 and thus upward movement of the shaft member 16 relative to the sleeve 50 is prevented, see FIG. 11. Further, when the pins 30 are slightly further advanced, the trailing pin 30 is registered with the groove 58 but the leading pin 30 is again in contact with the race 56, see FIG. 12, and thus movement of the shaft member upwardly relative to the sleeve 50 under the biasing action of the spring 62 is prevented. Of course, the pins 30 are engaged by those surfaces of the recesses 22 extending between the apex portions 26 and 28. When the pins 30 are disposed in the race 56, the drive unit 10 is in the overload mode of operation.

When the rotation of the unit 10 is subsequently terminated, the input section 12 may be rotated in a counterclockwise direction as viewed from above relative to the output section 14 and the pins 30 may thus be again engaged in the groove 58. Of course, after the pins 30 have been repositioned in the groove 58, the torque drive unit may again be used in a clockwise direction of rotation as viewed from above.

Figure 8:
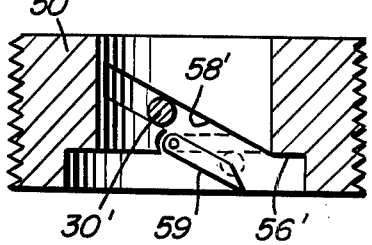
FIG. 8 comprises a vertical sectional view of a modified form of ramp defining component.

Referring now more specifically to FIG. 8, there will be seen a modified form of sleeve 50'. The sleeve 50' is substantially identical to the sleeve 50, except that the open end of the groove 58' thereof corresponding to the groove 58 is provided with a pivoted spring biased ramp 59. In addition, the sleeve 50' is adapted to be used in conjunction with only single pins 30' corresponding to the pins 30. It is believed that it will be obvious from FIG. 8 of the drawings that after the pin 30' has cammed itself downwardly along and outwardly of the lower open end of the groove 58', the pin 30' will swing around the race 56' corresponding to the race 56 and engage the free end of the ramp 59 so as to swing the latter to a closed position. Therefore, it may be seen that operation of the unit 10 is the same, whether the sleeve 50 in conjunction with the pairs of pins 30 is used or the sleeve 50' in conjunction with single pins 30' is used. If only single pins 30' are to be used, the inner ends of the pins 30' may be secured in outwardly opening diametrically opposite radial bores formed in the shaft member 16 as opposed to the recesses 22.

The foregoing is considered as illustrative only of the principle of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as set forth in the claims which follow.

What is claimed as new is as follows:

1. A torque overload release drive unit including first and second torque input and torque output sections, said sections including coacting means coupling said sections together for relative rotation, and limited relative displacement along the axis of relative rotation of said sections, said input section including means for applying rotational torque thereto and said output section including means for applying rotary torque to a rotary driven member, spring means connected between said sections yieldingly biasing said sections toward one set of limit positions of displacement along said axis, one of said units including spiral ramp means concentric with said axis and the other of said sections including follower means engaged with said ramp means, said spiral ramp means terminating at one end thereof in a circumferential race means onto which said ramp means opens and in which the follower means is guidingly receivable for continuous movement therethrough after movement along said ramp means from the end thereof remote from said race means into the latter, said sections being displaced along said axis against the biasing action of said spring means during movement of said follower means along said ramp means toward said race means.

2. The combination of claim 1 wherein said spring means and one of said sections include coacting means operative to variably adjust said spring means and thus the biasing action exerted thereby.

3. The combination of claim 1 wherein said ramp comprises a spiral groove formed in said one section and a follower projecting outwardly from the other section generally radially of said axis and guidingly received in said groove.

4. The combination of claim 3 wherein said spring means and one of said sections include coacting means operative to variably adjust said spring means and thus the biasing action exerted thereby.

5. The combination of claim 1 wherein said one unit includes a pivoted ramp for closing the end of said ramp means opening into said race, said pivoted ramp being swingable between a first position projecting into said race and opening the end of the ramp means into said race and a second position bridging the last mentioned ramp means end.

6. The combination of claim 1 wherein said follower means includes at least one pin stationarily supported from said other section and projecting outwardly therefrom generally radially of said axis.

7. The combination of claim 1 wherein said follower means includes at least one pair of side-by-side pins supported from said other section and projecting outwardly therefrom generally radially of said axis, said pins being supported from said other section for shifting between first positions spaced along a spiral path concentric with said axis and of an incline corresponding to the incline of said spiral ramp means and second positions spaced along a circle concentric with said axis.

8. The combination of claim 1 wherein said one unit includes a pivoted ramp for closing the end of said ramp means opening into said race, said pivoted ramp being swingable between a first position projecting into said race and opening the end of the ramp means into said race and a second position bridging the last mentioned ramp means end, said follower means including at least one pin stationarily supported from said other section and projecting outwardly therefrom generally radially of said axis.

9. The combination of claim 1 wherein said sections include shaft portions concentric with said axis and having remote ends facing in opposite directions along said axis, said shaft portions comprising said means for applying rotational torque to said input section and for applying rotary torque to a rotary driven member.

* * * * *